June 10, 1947.

C. H. SAITER 2,422,132

CURRENT COLLECTOR

Filed July 3, 1945

INVENTOR.
CHARLES H. SAITER
BY
Kwis Hudson Boughton & Williams
ATTORNEYS

Patented June 10, 1947

2,422,132

UNITED STATES PATENT OFFICE 2,422,132

CURRENT COLLECTOR

Charles H. Saiter, Cleveland Heights, Ohio, assignor to The Cleveland Crane & Engineering Company, Wickliffe, Ohio, a corporation of Ohio Application July 3, 1945, Serial No. 602,987

4 Claims. (Cl. 191—45)

The present invention relates to current collectors for electrical distribution systems of the trolley type and, more particularly, to a current collector especially adapted for use with overhead material handling apparatus, such as, overhead traveling cranes, etc.

One of the principal objects of the invention is the provision of a novel and improved current collector for an electrical distribution system of the trolley type so constructed and arranged that the contact member thereof will readily follow the trolley conductor although the trolley conductor is very close to the trolley or carrier of which the current collector is a part.

The invention resides in certain constructions and combinations and arrangements of parts and further objects and advantages will be apparent to those skilled in the art to which the invention relates from the present specification, including a description of the preferred embodiment illustrated in the drawings forming a part thereof, in which similar reference characters designate corresponding parts, and in which.

Figure 1:
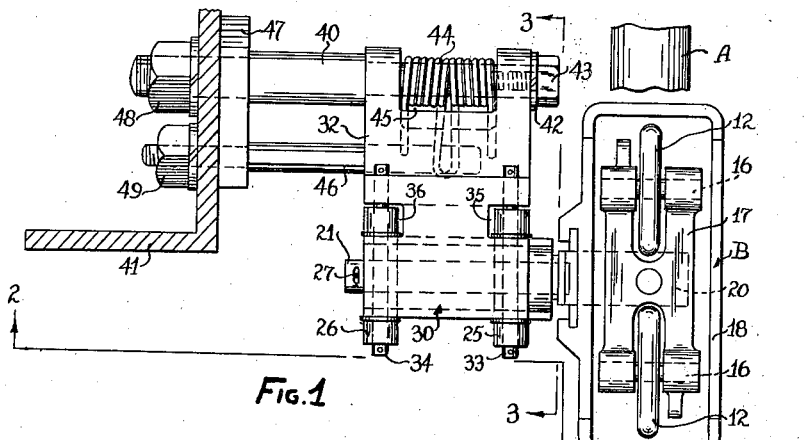
Fig. 1 is a fragmentary view approximately on the line 1—1 of Fig. 2 of an electrical distribution system embodying the present invention.

In certain respects, the current collector of the present invention may be considered an improvement over the current collector shown in U. S. Patent No. 2,358,116 and, although the invention is susceptible of being variously embodied and employed, it is herein shown and described as embodied in a current collector of an electrical distribution system for cranes similar to that shown in said patent. Only those parts of the crane and distribution system which are necessary to a complete understanding of the invention are herein shown and described in detail. For a more complete description of the crane and distribution system, reference is made to the aforesaid patent.

An overhead crane of the character referred to comprises a bridge movable along a crane runway by a reversible electric motor, commonly called the "bridge motor," and a trolley movable along the bridge by a reversible electric motor, commonly called the "trolley motor." The trolley includes suitable hoist mechanism including a cable drum driven by a reversible electric "hoist motor." The actuation of the electric motors is controlled from a control cage suspended from the bridge, the electric circuits between the motors on the trolley and the control mechanism being completed through trolley conductors carried by the bridge and current collectors carried by the trolley. The number of pairs of trolley conductors and current collectors employed will depend upon the number and type of motors, etc., to be controlled.

Referring to the drawings wherein only one trolley conductor and current collector is shown, the trolley conductor is designated generally by the reference character A and comprises a metal bar or rod-like member 10 of uniform cross-section throughout its length enclosed within an insulating covering 11 preferably made of rubber cemented or otherwise secured to the member 10. The underside of the member 10 has a substantially semi-circular groove or contact surface adapted to be engaged by the contactor member proper, in the present instance the collector wheels 12, of the current collector assembly, designated generally by the reference character B. The insulating covering 11 is inverted U-shaped in cross-section and the free ends thereof project downwardly a considerable distance below the contact surface of the conductor bar so as to make it practically impossible for a workman to accidentally come in contact with the electrically charged portion of the trolley conductor.

The trolley conductor A is carried by a part 15 of the bridge to which it is connected by a plurality of spaced, two-part connectors C, the right-hand ends of which, as viewed in the drawings, are attached to the member or members 15 in any suitable manner. The free ends of the connectors C are so formed that they engage around the upper part of the trolley conductor A and hold the same by friction while leaving the lower side of the trolley conductor open.

The aligned contact wheels 12 of the collector assembly B are carried by short shafts 16 rotatably supported in a metal bracket member 17 located within a contactor housing 18, which housing is made of insulating material. The contactor housing 18 is detachably connected to an L-shaped bracket 20 by a T-slot in the left-hand side thereof, as viewed in Figs. 1 and 2, within which an enlarged portion of the vertical side of the bracket engages. The upper end of the bracket 20 is fixed to a pin 21 rotatably supported in a sleeve 22 pivotally connected by pins 23, 24 to the lower ends of H-shaped links 25, 26, respectively. The bracket 20 is welded to the right-hand end of the pin 21 and the pin is held in assembled relation with the sleeve 22 by the bracket 20 and a cotter pin 27 extending through a suitable hole in the left-hand end of the pin, as viewed in the drawings. The pins 23, 24 project through apertures adjacent to opposite ends of the sleeve 22 and through apertures in the lower ends of the link members 25, 26. As shown, brass washers are interposed between the sleeve 22 and the links 25, 26 and the pins 23, 24 are retained assembled with the link members by suitable cotter pins.

The upper ends of the links 25, 26 are pivotally connected to a one-piece base member 30 comprising a generally horizontal part 31 and a part 32 inclined downwardly at an angle of 45° from the part 31. The links 25, 26 are connected to the part 31 of the base member by pins 33, 34 extending through suitable apertures in the upper ends of the links 25, 26 and the base member 30. In order to facilitate free movement of the link members, brass washers or the like are interposed between the link members and the base member 30. The pins 33, 34 are maintained assembled with respect to the link members 25, 26 and the member 30 by suitable cotter pins. The horizontal part 31 of the base member has portions 35, 36 thereof cut away to receive the rear upper ends of the H-shaped links 25, 26. The construction is such that the contactor housing 18 and, in turn, the contactor members proper are supported by the pin 21 for pivotal movement about an axis making a right angle with the length of the trolley conductor, and the axes about which the link members 25, 26 pivot are parallel with the trolley conductor.

Figure 3:
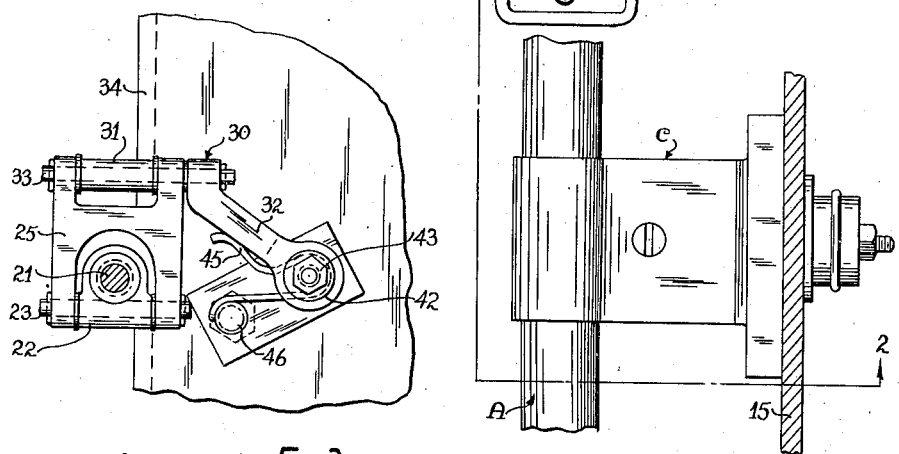
Fig. 3 is a view approximately on the line 3—3 of Fig. 1.

As previously stated and as clearly shown in Fig. 3, the base member 30 has, in addition to the generally horizontal portion 31 to which the link members 25, 26 are pivotally connected, a portion 32 projecting at an angle to the portion 31. The free end of the part 32 of the base member is in the form of a boss having an aperture therethrough through the medium of which the base member 30 is pivotally supported on the outer end of a base bolt or pin 40 fixedly secured to a part 41 of the crane trolley.

Figure 2:
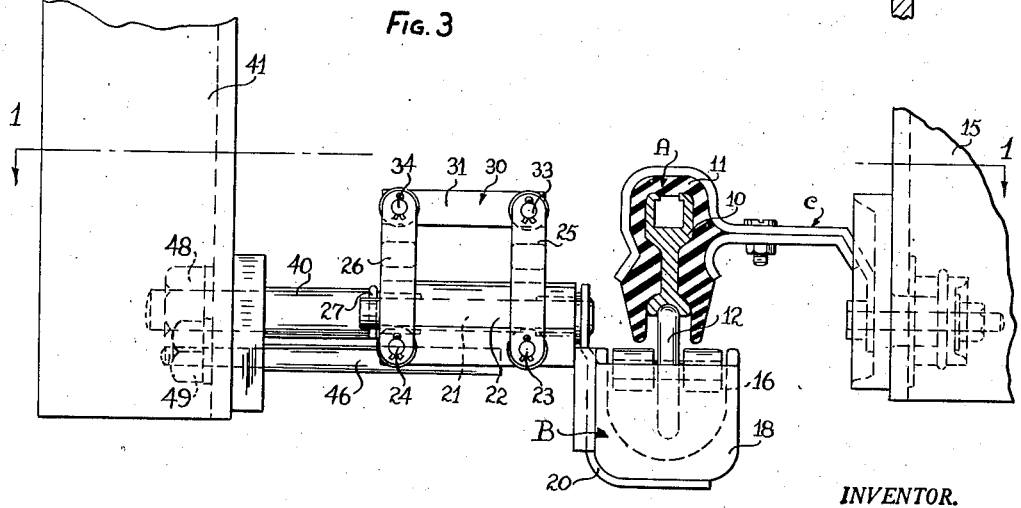
Fig. 2 is a view approximately on the line 2—2 of Fig. 1.

The right-hand end of the base pin 40, as viewed in Fig. 1, is of reduced diameter and the base member 30 is rotatably positioned thereon intermediate a shoulder formed by the reduction in diameter and a washer 42 interposed between the outer end of the base member 30 and the head of a machine screw 43 threaded into a suitably tapped aperture in the outer end of the base pin 40. The base member 30 is continuously urged in a direction to engage the contact wheels 12 with the trolley conductor, that is, in a clockwise direction as viewed in Fig. 3, by a coil spring 44 on the base pin 40 and located in a cut-out portion 45 of the part 32 of the base member. One end of the spring 44 engages the underside of the base member 30 and the other end thereof engages a spring abutment pin 46 also fixedly secured to the part 41 of the trolley. The base pin 40 and the abutment pin 46 may be fixed to the part 41 of the trolley in any suitable manner. As shown, the left-hand ends of the pins are of reduced diameter and project through suitably aligned apertures in a spacer member 47 and the part 41 and are securely fixed to the part 41 by nuts 48, 49 threaded on the rear ends thereof.

The operation of the collector will be apparent from the foregoing description. Suffice it to say that as the hoist trolley of the crane moves along the crane bridge, the contactor wheels 12 will readily follow the trolley conductor. The contactor housing 18 is free to move horizontally to follow any horizontal irregularities in the trolley conductor, etc., without varying the angularity of the axes of the wheels 12 with respect to the trolley conductor because of the pivoted link construction which, in effect, is a parallel motion mechanism and is free to move vertically to follow vertical irregularities in the trolley conductor, etc., because of the pivotal connection between the base 30 and the base pin 40. The housing 18 is also free to rotate about the axis of the pin 21, thus both contactor wheels 12 will always be in contact with the trolley conductor. In the event a carbon brush-type contactor member is used in place of the contactor wheels, a large contact area is assured.

From the foregoing description of the preferred embodiment of the invention, it will be apparent that the objects heretofore enumerated and others have been accomplished and that there has been provided a novel and improved current collector which is simple and rugged in construction, reliable in operation, and so devised that the contactor member proper will readily follow the trolley conductor even though the current collector is supported on or carried by a member located close to the trolley conductor. While the preferred embodiment of the invention has been herein illustrated and described in considerable detail, I do not wish to be limited to the particular construction shown and it is the intention to hereby cover all adaptations, modifications and uses thereof which come within the practice of those skilled in the art to which the invention relates and within the spirit and scope of the appended claims.

Having thus described my invention, what I claim is:

1. In a device of the character referred to, the combination of a first member adapted to carry a contactor and maintaining the same in engagement with a trolley conductor, a second member, means for supporting said first member from said second member for pivotal movement about an axis extending transversely of the trolley conductor, a third member, parallel motion mechanism supporting said second member from said third member for movement lengthwise of the first-named axis, means for supporting said third member for rotation about an axis parallel with said first-mentioned axis, and resilient means for continuously urging said third member about said last-mentioned axis and in a direction to engage the contactor with the trolley conductor.

2. In a device of the character referred to, the combination of a first member adapted to carry a contactor and maintaining the same in engagement with a trolley conductor, a second member, means for supporting said first member from said second member for pivotal movement about an axis extending transversely of the trolley conductor, a third member, parallel motion mechanism comprising two spaced links pivotally connected to said second member and to said third member for movement about axes extending lengthwise of the trolley conductor for supporting said second member from said third member for movement lengthwise of the first-named axis, means for supporting said third member for rotation about an axis parallel with said first-mentioned axis and offset to one side of said parallel motion mechanism, and resilient means for continuously urging said third member about said last-mentioned axis and in a direction to engage the contactor with the trolley conductor.

3. In a device of the character referred to, the combination of a contactor member adapted to engage and travel along a trolley conductor, a sleeve member, means for rotatably supporting said contactor member from said sleeve member for rotation about an axis extending transversely of the trolley conductor, a base member, parallel motion mechanism supporting said sleeve member from said base member for lengthwise movement, means for supporting said base member for rotation about an axis parallel with said first-mentioned axis, and resilient means for continuously urging said base member about said last-mentioned axis in a direction to engage said contactor member with the trolley conductor.

4. In a device of the character referred to, the combination of a contactor member adapted to engage and travel along a trolley conductor, a sleeve member, means for rotatably supporting said contactor member in said sleeve member for rotation about an axis extending transversely of the trolley conductor, a base member, parallel motion mechanism comprising two spaced links pivotally connected to said sleeve member and to said base member for movement about axes extending lengthwise of the trolley conductor for supporting said sleeve member from said base member for lengthwise movement, means for supporting said base member for rotation about an axis parallel with said first-mentioned axis and offset to one side of said parallel motion mechanism, and resilient means for continuously urging said base member about said last-mentioned axis in a direction to engage said contactor member with the trolley conductor.

CHARLES H. SAITER.

REFERENCES CITED

The following references are of record in the file of this patent:

UNITED STATES PATENTS

| Number | Name | Date |
|---|---|---|
| 1,692,893 | Gutzat | Nov. 27, 1928 |
| 2,358,116 | Wehr | Sept. 12, 1944 |